United States Patent [19]
Kusagaya

[11] Patent Number: 5,741,059
[45] Date of Patent: Apr. 21, 1998

[54] VEHICULAR HEADLAMP HAVING IMPROVED AIMING SCREW SUPPORTING STRUCTURE

[75] Inventor: Masahiro Kusagaya, Shizuoka, Japan

[73] Assignee: Koito Manufacturing Co., Ltd., Tokyo, Japan

[21] Appl. No.: 499,552

[22] Filed: Jul. 6, 1995

[30] Foreign Application Priority Data

Jul. 28, 1994 [JP] Japan .................. 6-194588

[51] Int. Cl.$^6$ .................................. B60Q 1/068
[52] U.S. Cl. .............. 362/66; 362/273; 362/289; 362/428
[58] Field of Search .................. 74/502.1, 417, 74/89.13, 89.14, 89.15; 362/61, 66, 69, 273, 289, 421–425, 428

[56] References Cited

U.S. PATENT DOCUMENTS

| | | | |
|---|---|---|---|
| 4,689,725 | 8/1987 | Saijo et al. | 362/66 |
| 4,712,164 | 12/1987 | McMahan | 362/66 |
| 4,713,739 | 12/1987 | Ryder et al. | 362/424 |
| 4,843,523 | 6/1989 | Nakamura | 362/69 |
| 4,916,587 | 4/1990 | Hirose et al. | 362/66 |
| 4,930,367 | 6/1990 | Nagasawa | 74/416 |
| 5,032,965 | 7/1991 | Weber | 362/428 |
| 5,034,870 | 7/1991 | Weber | 362/428 |
| 5,309,780 | 5/1994 | Schmitt | 74/89.13 |
| 5,355,287 | 10/1994 | Denley | 362/66 |
| 5,381,313 | 1/1995 | Choji | 362/66 |
| 5,390,098 | 2/1995 | Reiland | 362/428 |

*Primary Examiner*—Alan Cariaso
*Attorney, Agent, or Firm*—Sughrue, Mion, Zinn, Macpeak & Seas, PLLC

[57] ABSTRACT

A vehicular headlamp having a structure for supporting an aiming screw which includes an aiming screw constituted by a threaded part, a ball part integrally formed at a front end of the threaded part and a slide shaft part, which is not circular in cross section, formed at a rear end of the threaded part, a gear shaft rotatably supported by a lamp housing having a gear part and a threaded hole into which the threaded part of the aiming screw engages threadably, and a fastener member having a slide hole, which is not circular in cross section, and a fixing part for fixing the gear shaft to the lamp housing. The slide shaft part of the aiming screw slidably engages the slide hole of the fastener member, and the fastener member is prevented from rotating with respect to the lamp housing.

30 Claims, 6 Drawing Sheets

5,741,059

VEHICULAR HEADLAMP HAVING IMPROVED AIMING SCREW SUPPORTING STRUCTURE

BACKGROUND OF THE INVENTION

The present invention relates generally to a vehicular headlamp, and more particularly to an improved structure for supporting an aiming screw which can be easily assembled.

A conventional vehicular headlamp is provided with a structure in which an aiming screw is irrotatably connected to a headlamp unit. FIGS. 5 and 6 show a conventional structure of this type. An aiming screw a is constituted by a threaded part b and a ball part c formed integrally at an end of the threaded part b. A rotation preventing piece d, which has the form of a flat plate, projects from an end of the ball part c. The ball part c engages a spherical concave joint f of a receiving member e supported on a headlamp unit (not shown). The rotation preventing piece d engages an engaging concave part g formed continuously in the concave joint f, so that the a tip end of the aiming screw a is connected to the headlamp unit irrotatably with respect thereto.

A drive gear h threadably engages the threaded part b of the aiming screw a. When the drive gear h is rotated, since the aiming screw is not rotatable, the threaded part b is screwed in and out the drive gear h, whereupon the aiming screw a moves axially. Accordingly, the position of the headlamp unit where the receiving member e is supported is shifted, thereby to tilt the headlamp unit in a direction depending on the direction of rotation.

According to the conventional structure for supporting an aiming screw for a vehicular headlamp as described above, the rotation preventing piece d must be engaged with the engaging concave part g of the receiving member e when the tip end of the aiming screw a is connected to the headlamp unit. Since the receiving member e is positioned within a space between the lamp housing which supports the headlamp unit and the headlamp unit itself, which is hardly visible, it is difficult during assembly to engage the rotation preventing piece d with the engaging concave part g, and hence the workability of the assembly operation has been low.

SUMMARY OF THE INVENTION

The present invention was made in view of the foregoing difficulties accompanying the conventional structure as described above. It is therefore an object of the present invention to provide a vehicular headlamp with which the workability during assembly of an aiming screw support structure is improved.

The above and other objects can be achieved by a provision of a vehicular headlamp having a structure for supporting an aiming screw which, according to the present invention, includes: an aiming screw constituted by a threaded part, a ball part integrally formed at a front end of the threaded part and a slide shaft part, which is not circular in cross section, formed at a rear end of the threaded part; a gear shaft rotatably supported by a lamp housing having a gear part and a threaded hole into which the threaded part of the aiming screw is threadably engaged; and a fastener member having a slide hole, which is not circular in cross section, and a fixing part for fixing the gear shaft to the lamp housing, wherein the slide shaft part of the aiming screw slidably engages the slide hole of the fastener member, and the fastener member is prevented from rotating with respect to the lamp housing.

According to the inventive vehicular headlamp having a structure for supporting an aiming screw, since the slide shaft part of the aiming screw slidably engages the slide hole of the fastener member so as to be prevented from rotating, both the slide shaft part formed at the rear end of the aiming screw and the slide hole of the fastener member are easily visible during assembly of the aiming screw supporting structure, and accordingly the workability during assembly is much improved.

DESCRIPTION OF THE PREFERRED EMBODIMENTS

Figure 1:
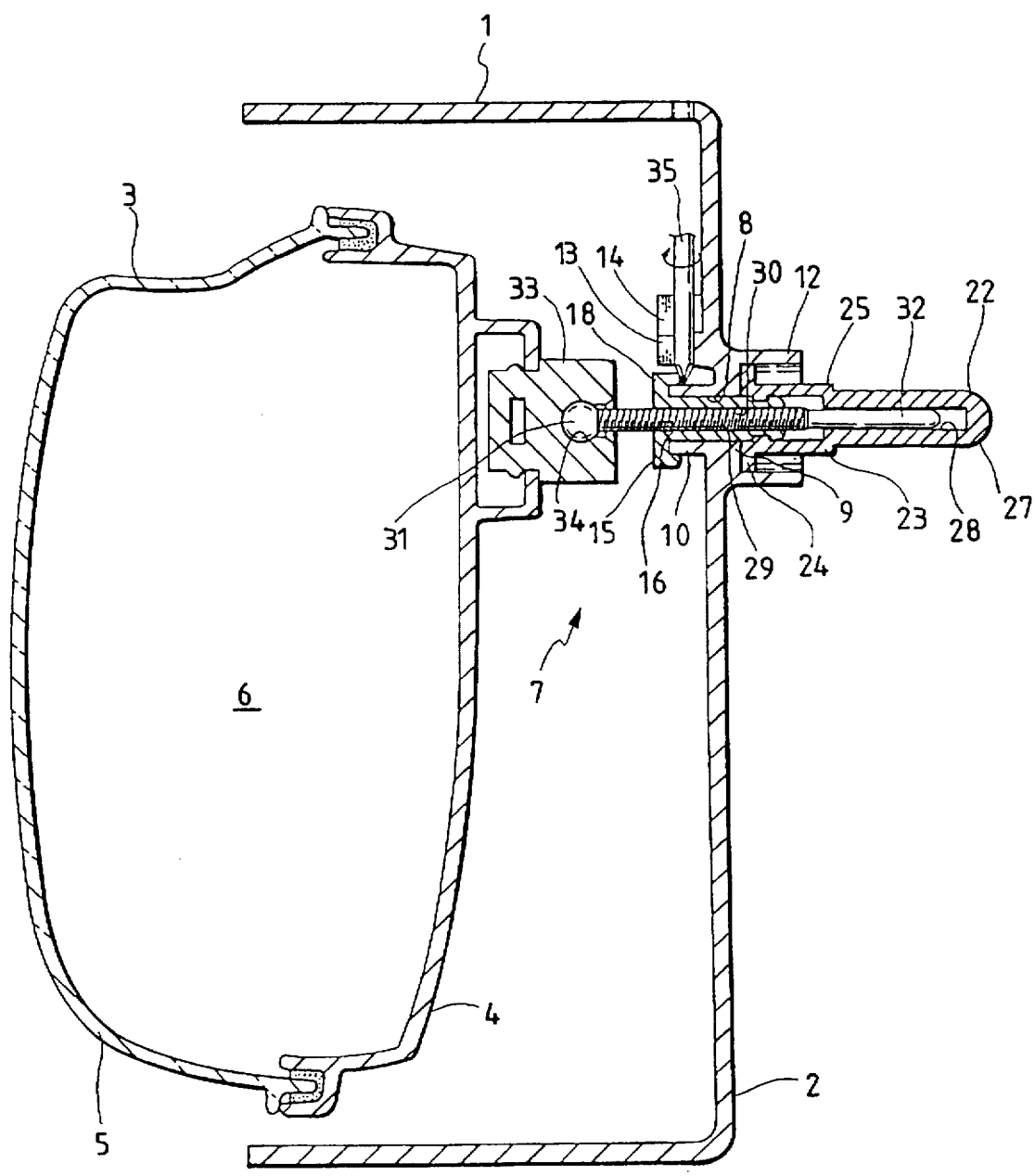
FIG. 1 is a cross-sectional view of a vehicular headlamp constructed according to a preferred embodiment of the present invention.
Figure 2:
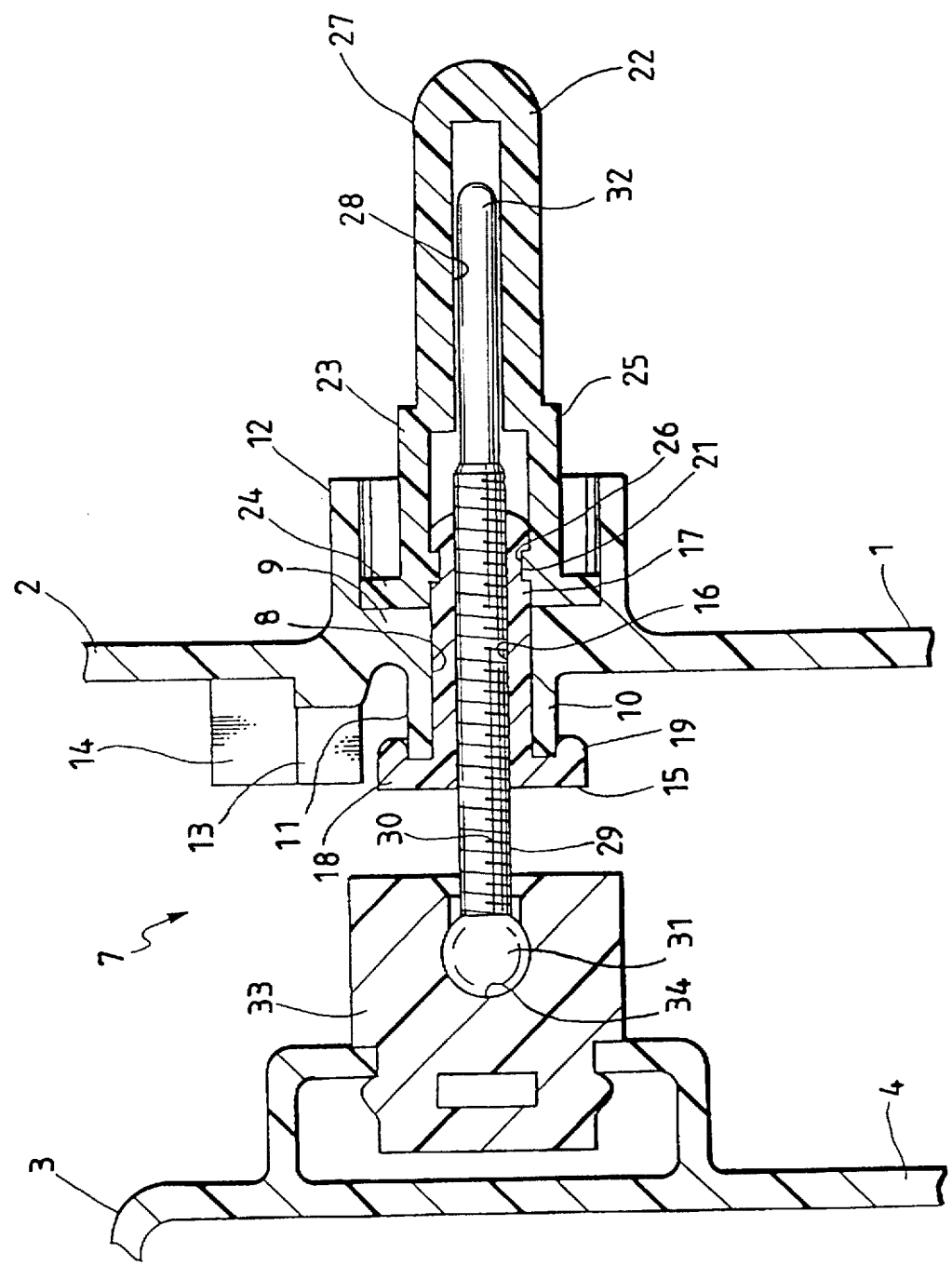
FIG. 2 is an enlarged sectional view showing an essential part of an aiming screw supporting structure of the invention shown in FIG. 1.
Figure 3:
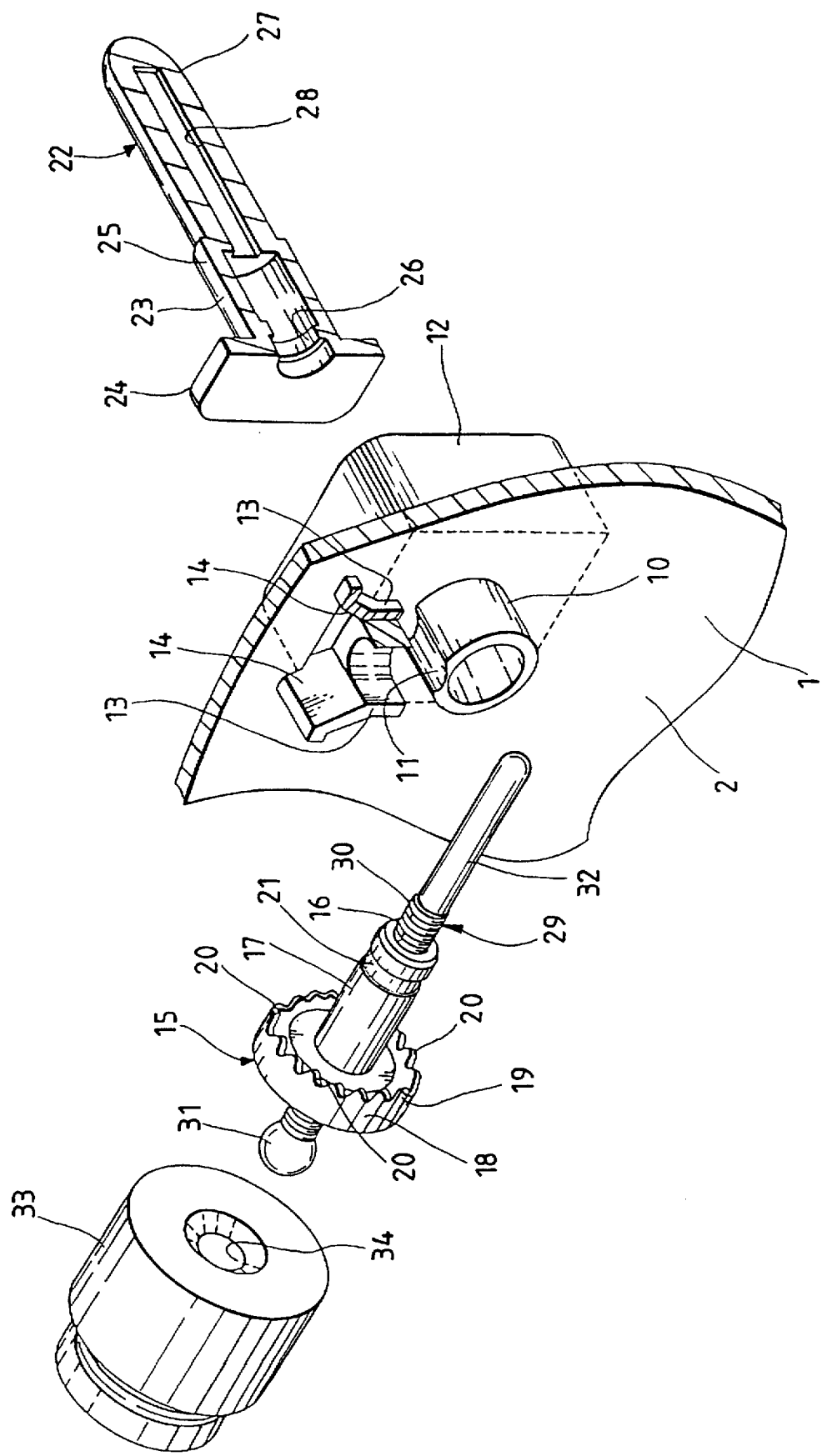
FIG. 3 is an exploded perspective view of the aiming screw supporting structure of the invention.

A preferred embodiment of a structure for supporting an aiming screw according to the present invention will now be described with reference to FIGS. 1–4 of the accompanying drawings.

As shown in the drawings, a lamp housing 1 having a rear wall 2 is secured to a vehicle body (not shown). A headlamp unit 3 is provided with a lamp body 4 and a front lens 5 for covering a front opening of the lamp body 4 to define a lamp chamber 6 therebetween, and a bulb (not shown) serving as a light source is mounted within the lamp chamber 6. The headlamp unit 3 is pivotally supported within the lamp housing 1 by one rotation fulcrum portion (not shown) and a pair of gap adjusting portions.

By varying the gap between the lamp housing 1 and the headlamp unit 3 at one of the gap adjusting portions, the headlamp unit 3 is made to pivotally rotate with respect to a line (pivot axis) extending between the other gap adjusting portion and the rotation fulcrum.

The aiming screw supporting structure of the present invention is applied to one of the gap adjusting portions 7.

A gear shaft described hereinbelow is inserted in a shaft through-hole 8 formed in the rear wall 2 of the lamp housing 1. A shaft-holding wall 9 projects rearward from an opening edge of the shaft through-hole 8, whereas a cylindrical gear shaft supporting wall 10 projects frontward therefrom. A concave portion 11, which is V-shaped having a flat bottom viewed from the rear, is formed above an upper peripheral surface of the gear shaft supporting wall 10. An engaging wall 12, which is rectangularly shaped view from the rear, projects from the rear surface of the rear wall 2 to surround the shaft-holding wall 9.

Driver supporting walls 13, which are parallel to each other, are formed on a front surface of the rear wall 2 at a position above the gear shaft supporting wall 10, and a recess defined between the driver supporting walls 13 is directed toward an upper end portion, namely, to a concave portion 11 of the gear shaft supporting wall 10. Further, driver guide walls 14 are formed on an upper end of the driver supporting walls 13 in such a manner that the driver guide walls 14 are inclined in such a manner that there are further from each other at their upper parts.

A gear shaft 15 is provided with a substantially cylindrical main part 17 having a threaded hole 16 and an integrally formed crown gear part 18 protruding outward from a front end of the main part 17. The crown gear part 18 includes a gear-forming edge 19 projecting rearward from a peripheral edge of a surface opposite the rear wall 2 of the lamp housing 1, and gear teeth 20 are formed at a rear surface of the gear-forming edge 19. On the other hand, an engaging concave groove 21 extending annularly in a peripheral direction is formed on the gear shaft 15 at a rear end part of the outer peripheral surface of the main part 17.

A fastener member 22 is formed of a synthetic resin having some degree of resiliency. The fastener member 22 is provided with a fixing part 23 which is constituted by a substantially rectangular base 24 and a cylindrical engaging part 25 projecting rearward from approximately the center portion of the base 24. An annular engaging projection 26 is formed at a front end portion of an inner peripheral surface of the engaging part 25. The base 24 has an outer contour which is substantially the same as the inner contour of the engaging wall 12 of the lamp housing 1. A connecting part 27 projects rearward from the rear end of the engaging part 25. The connecting part 27 is provided with a slide hole 28, which is continuous with a hole formed in the engaging part 25. The slide hole 28 is flat and rectangular in cross section.

The main part 17 of the gear shaft 15 is inserted, in order, from a front side surface of the rear wall 2 of the lamp housing 1 into the gear shaft supporting wall 10, the shaft through-hole 8 and the shaft-holding wall 9, so that the engaging concave groove 21 is located on the immediately rear side of the rear end of the shaft-holding wall 9. Then, the engaging part 25 of the fixing part 23 of the fastener member 22 is mounted on a portion of the gear shaft 15 projecting rearward from the shaft-holding wall 9, so that the engaging projection 26 of the engaging part 25 engages the engaging concave groove 21 of the gear shaft 15, thereby to cause the gear shaft 15 to be supported rotatably by the lamp housing 1. Thereafter, the base 24 of the fastening member 22 fits in the engaging wall 12 formed on the lamp housing 1.

An aiming screw 29 is integrally constituted by a main threaded part 30, a ball part 31 formed at the front end of the threaded part 30 and a slide shaft part 32, which is flat and rectangular in cross section, formed continuously at the rear end of the threaded part 30. The threaded part 30 of the aiming screw 29 thus constituted is threadably engaged with the threaded hole 16 of the main part 17 of the gear shaft 15.

A receiving member 33 formed of a synthetic resin is supported by the lamp body 4 of the headlamp unit 3. The receiving member 33 is provided with a spherical concave part 34 opening rearward. The ball part 31 of the aiming screw 29 fits in the spherical concave part 34 of the receiving member 33, so that the aiming screw 29 is pivotable and rotatable with respect to the receiving member 33, i.e., with respect to the headlamp unit 3.

The slide shaft part 32 of the aiming screw 29 slidably engages the slide hole of the fastener member 22. More specifically, first the threaded part 30 of the aiming screw 29 is threadedly engaged with the threaded hole 16 of the gear shaft 15, next the gear shaft 15 inserted in the lamp housing 1, then the fastener member 22 mounted on the rear end part of the gear shaft 15. During this operation, the slide shaft part 32 of the aiming screw 29 comes to face the slide hole 28 of the fastener member 22 to be engaged therewith. Since the outer contour of the base 24 of the fastener member 22 is the same as the inner contour of the engaging wall 12 formed on the rear wall 2 of the lamp housing 1, the fastener member 22 is irrotatable with respect to the lamp housing 1, and, accordingly, the aiming screw 29 is also irrotatable because the slide shaft part 32 thereof engages the slide hole 28 of the fastener member 22.

An initial aiming adjustment is accomplished as discussed hereinbelow with the aiming screw supporting structure described above.

Figure 4:
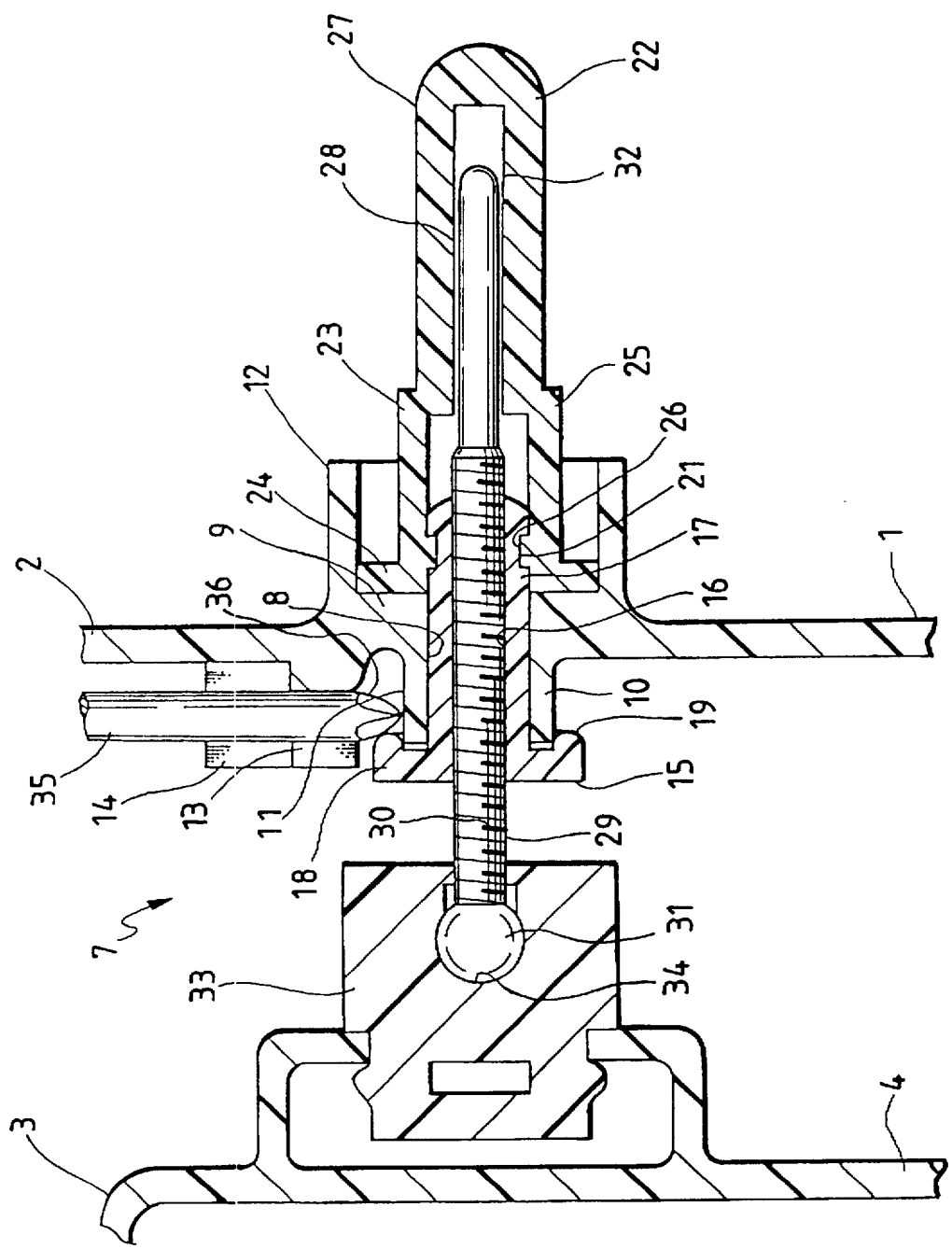
FIG. 4 is an enlarged sectional view showing an essential part of the aiming screw supporting structure shown in FIG. 2, in which an aiming adjustment is operated.
Figure 5:
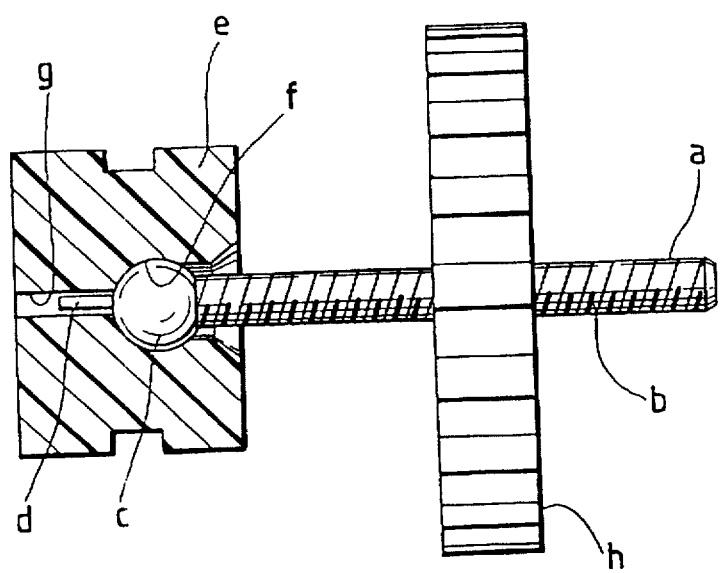
FIG. 5 is side view showing a conventional aiming screw supporting structure.
Figure 6:
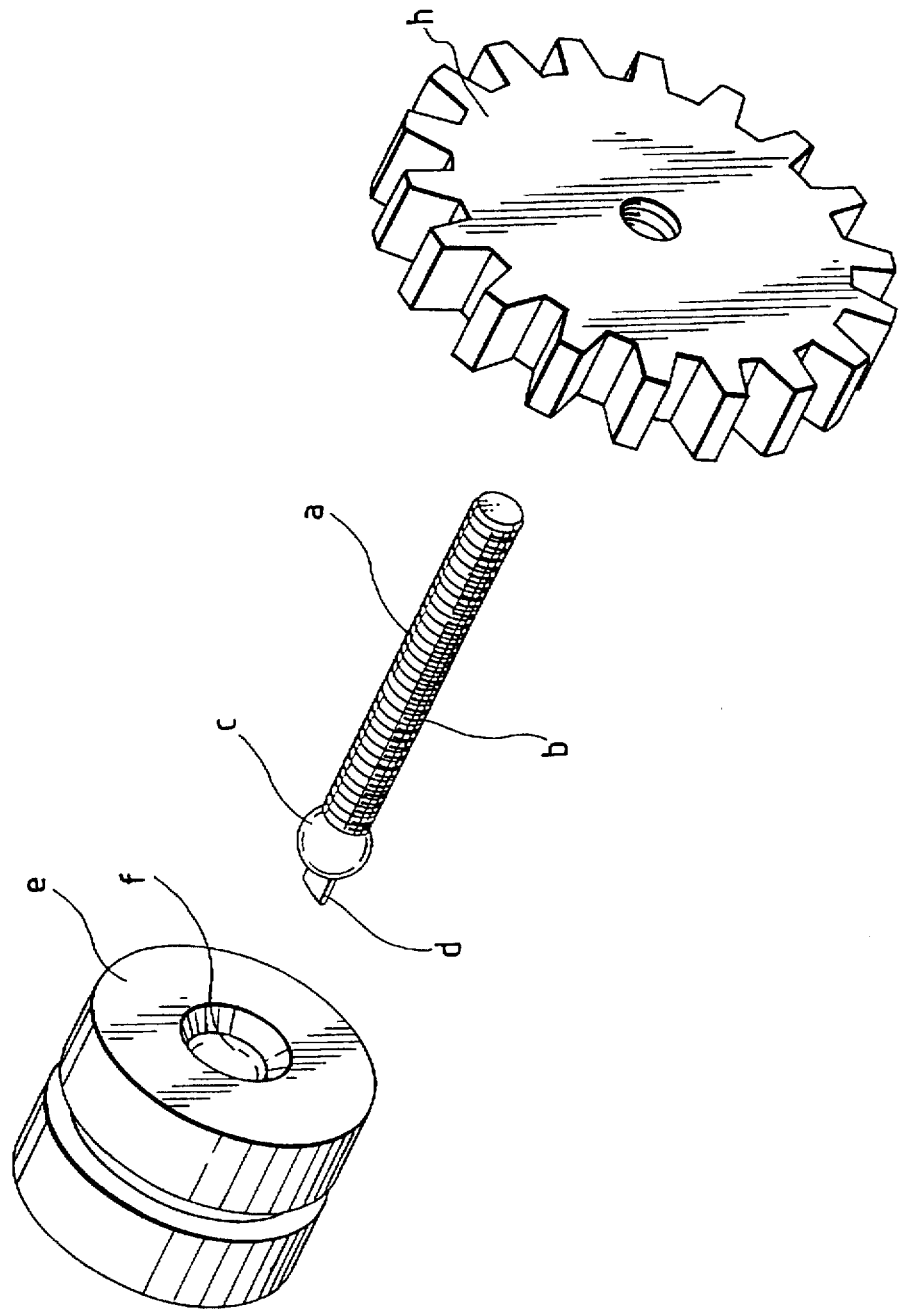
FIG. 6 is an enlarged perspective view showing the conventional aiming screw supporting structure.

As shown in FIG. 4, a Phillips screwdriver 35 is inserted from above to engage a tip end part 36 of the driver with the gear teeth 20 of the crown gear part 18 of the gear shaft 15. In this operation, the tip end part 36 of the Phillips driver 35 is guided by the driver guide walls 14 formed integrally with the rear wall 2 of the lamp housing 1 in the recess defined between the driver supporting walls 13. Then, the tip end part 36 of the Phillips driver is positioned in the concave portion 11 formed above the gear shaft supporting wall 10, and a part of the driver 35 just above the tip end part 36 is held by the driver supporting walls 13 so as to restrict the position of the driver 35 so as to hold the driver 35 steady.

When the Phillips driver 35 is rotated, the tip end part 36 thereof rotates the gear teeth 20 of the crown gear part 18, so that the gear shaft 15 is rotated. In this operation, when the gear shaft 15 rotates, the aiming screw 29 does not rotate because the slide shaft part 32 thereof is engaged with the slide hole 28 of the fastener member 22. Therefore, the threaded part 30 which engages the threaded hole 16 of the gear shaft 15 is moved, thereby to move the aiming screw 29 in the forward or rearward direction according to the direction of rotation of the gear shaft 15. Owing to the operation, the gap between the rear wall 2 of the lamp housing 1 and the headlamp unit 3 at the gap adjusting portion 7 is varied, and the headlamp unit 3 is pivotally rotated with respect to a line (a pivot axis) extending between the other gap adjusting portion and the rotation fulcrum (not shown). The aiming adjustment, that is, the adjustment of the illumination axis of the headlamp, is thus accomplished.

As described above, a vehicular headlamp having an aiming screw supporting structure according to the present invention includes: an aiming screw constituted by a threaded part, a ball part integrally formed at a front end of the threaded part and a slide shaft part, which is not circular in cross section, formed at a rear end of the threaded part; a gear shaft rotatably supported by a lamp housing having a gear part and a threaded hole into which the threaded part of the aiming screw engages threadably; and a fastener member having a slide hole, which is not circular in cross section, and a fixing part for fixing the gear shaft to the lamp housing, wherein the slide shaft part of the aiming screw slidably engages the slide hole of the fastener member, and the fastener member is prevented from rotating with respect to the lamp housing.

According to the vehicular headlamp having a structure for supporting an aiming screw, since a slide shaft part of an aiming screw slidably engages a slide hole of a fastener member to be prevented from rotating, both the slide shaft part formed at a rear end of the aiming screw and the slide hole of the fastener member are easily visible during the assembly of the aiming screw structure, and, accordingly, the workability during assembly is much improved.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. An aiming screw supporting structure for a vehicular headlamp, comprising:

an aiming screw member comprising a threaded part, a ball part integrally formed at a front end of said threaded part, and slide shaft part formed at a rear end of said threaded part, said slide shaft part being unthreaded and not circular in cross section;

a gear shaft member rotatably supported by a lamp housing for the headlamp, comprising a gear part having a threaded hole into which said threaded part of said aiming screw is threadably engaged; and a fastener member prevented from rotating with respect to the lamp housing, said fastener member having formed therein a longitudinal slide hole within which said unthreaded slide shaft part of the aiming screw member is slidably engaged, said slide hole being unthreaded and not circular in cross section, and comprising a fixing part for fixing said gear shaft member to the lamp housing.

2. An aiming screw supporting structure for a vehicular headlamp, comprising:

an aiming screw member comprising a threaded part, a ball part integrally formed at a front end of said threaded part, and a slide shaft part formed at a rear end of said threaded part, and a slide shaft part being not circular in cross section;

a gear shaft member rotatably supported a lamp housing for the headlamp, comprising a gear part and having a threaded hole into which said threaded part of said aiming screw is threadably engaged; and a fastener member prevented from rotating with respect to the lamp housing, said fastener member having formed therein aa slide hole with which said slide shaft part of the aiming screw member is slidably engaged, said slide hole being not circular in cross section, and comprising a fixing part for fixing said gear shaft member to the lamp housing, wherein said gear part of said gear shaft member comprises a crown gear projecting rearward.

3. An aiming screw supporting structure for a vehicular headlamp, comprising:

an aiming screw member comprising a threaded part, a ball part integrally formed at a front end of said threaded part, and a slide shaft part formed at a rear end of said threaded part, said slide shaft part being not circular in cross section;

a gear shaft member rotatably supported by a lamp housing for the headlamp, comprising a gear part and having a threaded hole into which said threaded part of said aiming screw is threadably engaged; and a fastener member prevented from rotating with respect to the lamp housing, said fastener member having formed therein a slide hole with which said slide shaft part of the aiming screw member is slidably engaged, said slide hole being not circular in cross section, and comprising a fixing part for fixing said gear shaft member to the lamp housing, wherein said gear part of said gear shaft member comprises a gear-forming edge projecting rearward from a peripheral edge of a surface opposite to a rear wall of the lamp housing, and gear teeth are formed at a rear surface of said gear-forming edge.

4. An aiming screw supporting structure for a vehicular headlamp, comprising:

an aiming screw member comprising a threaded part, a ball part integrally formed at a front end of said threaded part, and a slide shaft part formed at a rear end of said threaded part, said slide shaft part being not circular in cross section;

a gear shaft member rotatably supported by a lamp housing for the headlamp, comprising a gear part and having a threaded bole into which said threaded part of said aiming screw is threadably engaged; and a fastener member prevented from rotating with respect to the lamp housing, said fastener member having formed therein a slide hole with which said slide shaft part of the aiming screw member is slidably engaged, said slide hole being not circular in cross section, and comprising a fixing part for fixing said gear shaft member to the lamp housing, wherein said gear shaft member comprises an engageable concave groove extending annularly in a peripheral direction thereof.

5. An aiming screw supporting structure for a vehicular headlamp comprising:

an aiming screw member comprising a threaded part, a ball part integrally formed at a front end of said threaded part, and a slide shaft part formed at a rear end of said threaded part, said slide shaft part being not circular in cross section;

a gear shaft member rotatably supported a lamp housing for the headlamp, comprising a gear part and having a threaded hole into which said threaded part of said aiming screw is threadably engaged; and a fastener member prevented from rotating with respect to the lamp housing, said fastener member having formed therein a slide hole with which said slide shaft part of the aiming screw member is slidably engaged, said slide hole being not circular in cross section, and comprising a fixing part for fixing said gear shaft member to the lamp housing, wherein a shaft through-hole is formed in a rear wall of the lamp housing through which said gear shaft member is inserted, and further comprising a shaft-holding wall projecting rearward from an opening edge of said shaft through-hole, and a cylindrical gear shaft supporting wall projecting frontward from said shaft through-hole.

6. An aiming screw supporting structure for a vehicular headlamp, comprising:

an aiming screw member comprising a threaded part, a ball part integrally formed at a front end of said threaded part, and a slide shaft part formed at a rear end of said threaded part, said slide shaft part being not circular in cross section;

a gear shaft member rotatably supported a lamp housing for the headlamp, comprising a gear part and having a threaded hole into which said threaded part of said aiming screw is threadably engaged; and a fastener member prevented from rotating with respect to the lamp housing, said fastener member having formed therein a slide hole with which said slide shaft part of the aiming screw member is slidably engaged, said slide hole being not circular in cross section, and comprising a fixing part for fixing said gear shaft member to the lamp housing, wherein said fixing part of said fastener member comprises a substantially rectangular base and a cylindrical engaging part projecting rearward from approximately a center portion of said base.

7. The aiming screw supporting structure according to claim 6, further comprising a substantially rectangular engaging wall projecting from a rear surface of the lamp housing, said base having an outer contour which is substantially the same as an inner contour of said engaging wall.

8. The aiming screw supporting structure according to claim 1, wherein said slide hole of said fastener member is flat and rectangular in cross section.

9. The aiming screw supporting structure according to claim 5, further comprising a pair of driver supporting walls formed on a front surface of the rear wall of the lamp housing at a position above said gear shaft supporting wall, a recess being defined between said driver supporting walls, said recess being directing toward an upper end portion of said gear shaft supporting wall.

10. The aiming screw supporting structure according to claim 9, further comprising a pair of driver guide walls formed on an upper end of said driver supporting walls in such a manner that said driver guide walls are inclined so as to be further from each other at upper parts than at lower parts thereof.

11. The aiming screw supporting structure according to claim 1, further comprising a receiving member supported by a lamp body for receiving said ball part of said aiming screw member.

12. The aiming screw supporting structure according to claim 11, wherein said receiving member is formed of synthetic resin.

13. The aiming screw supporting structure according to claim 1, wherein said fastener member is formed of synthetic resin having resiliency.

14. A vehicular headlamp, comprising:
a lamp housing secured to a vehicle body, said lamp housing having a rear wall;
a headlamp unit comprising a lamp body and a front lens covering a front opening of said lamp body; and
a gap adjusting structure for pivotally supporting said headlamp unit within said lamp housing, said gap adjusting structure comprising:
an aiming screw member comprising a threaded part, a ball part integrally formed at a front end of said threaded part, and a slide shaft part formed at a rear end of said threaded part, said slide shaft part being unthreaded and not circular in cross section;
a gear shaft member rotatably supported by a lamp housing for the headlamp, comprising a gear part and having a threaded hole into which said threaded part of said aiming screw is threadably engaged; and
a fastener member prevented from rotating with respect to the lamp housing, said fastener member having formed therein a longitudinal a slide hole within which said unthreaded slide shaft part of the aiming screw member is slidably engaged, said slide hole being unthreaded and not circular in cross section, and comprising a fixing part for fixing said gear shaft member to the lamp housing.

15. A vehicular headlamp, comprising:
a lamp housing secured to a vehicle body, said lamp housing having a rear wall;
a headlamp unit comprising a lamp body and a front lens covering a front opening of said lamp body; and a gap adjusting structure for pivotally supporting said headlamp unit within said lamp housing, said gap adjusting structure comprising:
an aiming screw member comprising a threaded part, a ball part integrally formed at a front end of said threaded part, and a slide shaft part formed at a rear end of said threaded part, said slide shaft part being not circular in cross section;
a gear shaft member rotatably supported by a lamp housing for the headlamp, said gear shaft member comprising a gear part and having a threaded hole into which said threaded part of said aiming screw is threadably engaged; and
a fastener member prevented from rotating with respect to the lamp housing, said fastener member having formed therein a slide hole with which said slide shaft part of said aiming screw member is slidably engaged, said slide hole being not circular in cross section, and comprising a fixing part for fixing said gear shaft member to the lamp housing,
wherein said gear part of said gear shaft member comprises a crown gear projecting outward.

16. A vehicular headlamp, comprising:
a lamp housing secured to a vehicle body, said lamp housing having a rear wall;
a headlamp unit comprising a lamp body and a front lens covering a front opening of said lamp body; and
a gap adjusting structure for pivotally supporting said headlamp unit within said lamp housing, said gap adjusting structure comprising:
an aiming screw member comprising a threaded part, a ball part integrally formed at a front end of said threaded part, and a slide shaft part formed at a rear end of said threaded part, said slide shaft part being unthreaded and not circular in cross section;
a gear shaft member rotatably supported by a lamp housing for the headlamp, comprising a gear part and having a threaded hole into which said threaded part of said aiming screw is threadably engaged; and
a fastener member prevented from rotating with respect to the lamp housing, said fastener member having formed therein a longitudinal slide hole within which said unthreaded slide shaft part of the aiming screw member is slidably engaged, said slide hole being unthreaded and not circular in cross section, and comprising a fixing part for fixing said gear shaft member to the lamp housing,
wherein said gear part of said gear shaft member comprises a gear-forming edge projecting rearward from a peripheral edge of a surface opposite to said rear wall of said lamp housing, gear teeth being formed at a rear surface of said gear-forming edge.

17. A vehicular headlamp, comprising:
a lamp housing secured to a vehicle body, said lamp housing having a rear wall;
a headlamp unit comprising a lamp body and a front lens covering a front opening of said lamp body; and
a gap adjusting structure for pivotally supporting said headlamp unit within said lamp housing, said gap adjusting structure comprising:
an aiming screw member comprising a threaded part, a ball part integrally formed at a front end of said threaded part, and slide shaft part formed at a rear end of said threaded part, said slide shaft part being unthreaded and not circular in cross section;
a gear shaft member rotatably supported by a lamp housing for the headlamp, comprising a gear part and having a threaded hole into which said threaded part of said aiming screw is threadably engaged; and a fastener member prevented from rotating with respect to the lamp housing, said fastener member having formed therein a longitudinal slide hole within which said unthreaded slide shaft part of the aiming screw member is slidably engaged, said slide hole being unthreaded and not circular in cross section, and comprising a fixing part for fixing said gear shaft member to the lamp housing, wherein said gear shaft member comprises an engageable concave groove extending annularly in a peripheral direction thereof.

18. A vehicular headlamp, comprising:

a lamp housing secured to a vehicle body, said lamp housing having a rear wall;

a headlamp unit comprising a lamp body and a front lens covering a front opening of said lamp body; and a gap adjusting structure for pivotally supporting said headlamp unit within said lamp housing, said gap adjusting structure comprising:

an aiming screw member comprising a threaded part, a ball part integrally formed at a front end of said threaded part, and a slide shaft part formed at a rear end of said threaded part, said slide shaft part being not circular in cross section;

a gear shaft member rotatably supported by a lamp housing for the headlamp, said gear shaft member comprising a gear part and having a threaded hole into which said threaded part of said aiming screw is threadably engaged; and a fastener member prevented from rotating with respect to the lamp housing, said fastener member having formed therein a slide hole with which said slide shaft part of said aiming screw member is slidably engaged, said slide hole being not circular in cross section, and comprising a fixing part for fixing said gear shaft member to the lamp housing, wherein a shaft through-hole is formed in said rear wall of said lamp housing through which said gear shaft member is inserted, and further comprising a shaft-holding wall projecting rearward from an opening edge of said shaft through-hole, and a cylindrical gear shaft supporting wall projecting frontward from said shaft through-hole.

19. A vehicular headlamp, comprising:

a lamp housing secured to vehicle body, said lamp housing having a rear wall;

a headlamp unit comprising a lamp body and a front lens covering a front opening of said lamp body; and a gap adjusting structure for pivotally supporting said headlamp unit within said lamp housing, said gap adjusting structure comprising:

an aiming screw member comprising a threaded part, a ball part integrally formed at a front end of said threaded part, and a slide shaft part formed at a rear end of said threaded part, said slide shaft part being not circular in cross section;

a gear shaft member rotatably supported by a lamp housing for the headlamp, said gear shaft member comprising a gear part and having a threaded hole into which said threaded part of said aiming screw is threadably engaged; and a fastener member prevented from rotating with respect to the lamp housing, said fastener member having formed therein a slide hole with which said slide shaft part of said aiming screw member is slidably engaged, said slide hole being not circular in cross section, and comprising a fixing part for fixing said gear shaft member to the lamp housing, wherein said fixing part of said fastener member comprises a substantially rectangular base and a cylindrical engaging part projecting rearward from approximately a center portion of said base.

20. The vehicular headlamp according to claim 19, further comprising a substantially rectangular engaging wall projecting from a rear surface of said rear wall of said lamp housing, said base having an outer contour which is substantially the same as an inner contour of said engaging wall.

21. The vehicular headlamp according to claim 14, wherein said slide hole of said fastener member is a flat and rectangular in cross section.

22. The vehicular headlamp according to claim 18, further comprising a pair of driver supporting walls formed on a front surface of said rear wall of said lamp housing at a position above said gear shaft supporting wall, a recess being defined between said driver supporting walls, said recess being directed to an upper end portion of said gear shaft supporting wall.

23. The vehicular headlamp according to claim 22, further comprising a pair of driver guide walls formed on an upper end of said driver supporting walls in such a manner that said driver guide walls are inclined so as to be further from each other at upper parts than at lower parts thereof.

24. The vehicular headlamp according to claim 14, further comprising a receiving member supported by said lamp body for receiving said ball part of said aiming screw member.

25. The vehicular headlamp according to claim 24, wherein said receiving member is formed of synthetic resin.

26. The vehicular headlamp according to claim 14, wherein said fastener member is formed of synthetic resin having a resiliency.

27. An aiming screw supporting structure for a vehicular headlamp, comprising:

an aiming screw member comprising a threaded part, a ball part integrally formed at a front end of said threaded part, and a slide shaft part formed at a rear end of said threaded part, said slide shaft part being not circular in cross section;

a gear shaft member rotatably supported by a lamp housing for the headlamp, comprising a gear part and having a threaded hole into which said threaded part of said aiming screw is threadably engaged; and a fastener member prevented from rotating with respect to the lamp housing, said fastener member having formed therein a slide hole with which said slide shaft part of the aiming screw member is slidably engaged, said slide hole being not circular in cross section, and comprising a fixing part for fixing said gear shaft member to the lamp housing, wherein said gear part of said gear shaft member comprises a crown gear projecting outward;

wherein said gear part of said gear shaft member comprises a gear-forming edge projecting rearward from a peripheral edge of a surface opposite to a rear wall of the lamp housing, and gear teeth are formed at a rear surface of said gear-forming edge.

28. An aiming screw supporting structure for a vehicular headlamp, comprising:

an aiming screw member comprising a threaded part, a ball part integrally formed at a front end of said threaded part, and a slide shaft part formed at a rear end of said threaded part, said slide shaft part being not circular in cross section;

a gear shaft member rotatably supported by a lamp housing for the headlamp, comprising a gear part and having a threaded hole into which said threaded part of said aiming screw is threadably engaged; and a fastener member prevented from rotating with respect to the lamp housing, said fastener member having formed therein a slide hole with which said slide shaft part of the aiming screw member is slidably engaged, said slide hole being not circular in cross section, and comprising a fixing part for fixing said gear shaft member to the lamp housing, wherein said gear part of said gear shaft member comprises a crown gear projecting outward;

wherein said gear shaft member comprises an engageable concave groove extending annularly in a peripheral direction thereof.

29. A vehicular headlamp, comprising:

a lamp housing secured to a vehicle body, said lamp housing having a rear wall;

a headlamp unit comprising a lamp body and a front lens covering a front opening of said lamp body; and a gap adjusting structure for pivotally supporting said headlamp unit within said lamp housing, said gap adjusting structure comprising:

an aiming screw member comprising a threaded part, a ball part integrally formed at a front end of said threaded part, and a slide shaft part formed at a rear end of said threaded part, said slide shaft part being not circular in cross section;

a gear shaft member rotatably supported by a lamp housing for the headlamp, comprising a gear part and having a threaded hole into which said threaded part of said aiming screw is threadably engaged; and a fastener member prevented from rotating with respect to the lamp housing, said fastener member having formed therein a slide hole with which said slide shaft part of the aiming screw member is slidably engaged, said slide hole being not circular in cross section, and comprising a fixing part for fixing said gear shaft member to the lamp housing, wherein said gear part of said gear shaft member comprises a crown gear projecting outward;

wherein said gear part of said gear shaft member comprises a gear-forming edge projecting rearward from a peripheral edge of a surface opposite to said rear wall of said lamp housing, gear teeth being formed at a rear surface of said gear-forming edge.

30. A vehicular headlamp, comprising:

a lamp housing secured to a vehicle body, said lamp housing having a rear wall;

a headlamp unit comprising a lamp body and a front lens covering a front opening of said lamp body; and a gap adjusting structure for pivotally supporting said headlamp unit within said lamp housing, said gap adjusting structure comprising:

an aiming screw member comprising a threaded part, a ball part integrally formed at a front end of said threaded part, and a slide shaft part formed at a rear end of said threaded part, said slide shaft part being not circular in cross section;

a gear shaft member rotatably supported by a lamp housing for the headlamp, comprising a gear part and having a threaded hole into which said threaded part of said aiming screw is threadably engaged; and a fastener member prevented from rotating with respect to the lamp housing, said fastener member having formed therein a slide hole with which said slide shaft part of the aiming screw member is slidably engaged, said slide hole being not circular in cross section, and comprising a fixing part for fixing said gear shaft member to the lamp housing, wherein said gear part of said gear shaft member comprises a crown gear projecting outward;

wherein said gear shaft member comprises an engageable concave groove extending annularly in a peripheral direction thereof.

* * * * *